2,983,747

PROCESS FOR MAKING THIOLCARBAMATES

Ramsey G. Campbell, Berkeley, and Gilbert E. Klingman, Walnut Creek, Calif., assignors to Stauffer Chemical Company, a corporation of Delaware No Drawing. Filed July 28, 1958, Ser. No. 751,132

2 Claims. (Cl. 260—455)

This invention relates to a method of making esters of thiolcarbamic acids and particularly relates to a method wherein a carbamyl chloride is reacted with a mercaptan utilizing zinc chloride as a catalyst.

The esters of thiolcarbamic acid are useful for a number of purposes including their use as herbicides. Heretofore, such esters have been difficult to produce. One process involves reacting the sodium salt of a mercaptan with a carbamyl chloride in the presence of a solvent. The use of the sodium salt of the mercaptan causes the problems of filtration and solids handling and the use of a solvent involves the reduction of reactor throughput, as well as the solvent recovery problem. Hydrogen is evolved when making the sodium salt of the mercaptan and this causes a disposal problem. Another proposed process is the reaction of the mercaptan with the carbamyl chloride in the presence of an acid binding agent such as pyridine. These agents are toxic, expensive and pose a difficult recovery problem. The value of the hydrogen chloride is lost.

It has now been discovered that carbamyl chlorides can be reacted directly with mercaptans to produce the desired thiolcarbamic esters if zinc chloride is employed as a catalyst. The reaction can be conducted without the use of a solvent, and since no sodium salt is involved, there is no filtration or solids handling problem. A batch or continuous process can be used.

When it was attempted to conduct the reaction without a catalyst, it was found that the reaction would not go at any appreciable rate below 170° C., and that if the reaction were conducted at a higher temperature, there was a substantial decomposition reducing the yield.

The reaction of the present invention can be represented as follows:

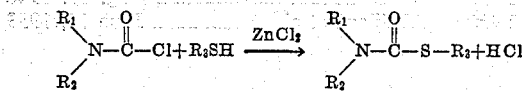

In the above formula, $R_1$ and $R_2$ can be any organic radical, but preferably are lower alkyl, lower alkenyl or phenyl radicals which may be the same or different. $R_3$ may be a lower alkyl or phenyl radical. It is surprising that zinc chloride catalyzes this reaction since zinc chloride has been found to be the only catalyst which will appreciably speed up this reaction and result in high yield and purity. Other closely related catalysts, such as ferrous chloride and stannous chloride, do not give these results.

Although it has been stated above that one of the objectives of the invention is to do away with the use of solvents, the present reaction can be conducted in the presence of an inert solvent if desired. However, there is no advantage to using a solvent since it causes a recovery problem. So the use of solvents is generally avoided.

Moderately elevated temperatures are useful in carrying out the reaction. Generally speaking, the temperature should be maintained in the range of 20° to 160° C.

The amount of zinc chloride which is used is not critical as any amount will tend to increase the reaction rate, but in order to secure practical results, it is best to use from 0.5 to 20 grams per gram mole of carbamyl chloride and preferably between 2 and 10 grams per gram mole. The amount of zinc chloride used depends on the reaction temperature and the desired rate of reaction.

Normally, the mercaptan is employed in an excess over the stoichiometric amount with the carbamyl chloride. Any excess mercaptan used is recovered and recycled.

The following non-limiting examples illustrate preferred methods of practicing the present invention:

*Example 1 — Production of ethyl di-n-propylthiolcarbamate.*—To a round bottom flask fitted with a thermometer and reflux condenser are added 163.5 g. (1 mole) of di-n-propylcarbamyl chloride and 124 g. (2 moles) of ethyl mercaptan. The condenser is refrigerated because of the low boiling point of the ethyl mercaptan. The excess mercaptan is used to ensure a complete reaction.

The flask is placed in a heating mantle and about 7.5 g. of anhydrous $ZnCl_2$ is added. The reaction starts at once at room temperature, but after the temperature reaches 40° C., gentle heating is applied. The temperature increases gradually as the reaction proceeds, and the reaction is essentially complete in about 1.5 hours. At this time, the temperature is about 75° C. The last traces of reaction are completed during an additional one-half hour reaction period. Hydrogen chloride is evolved as a by-product of the reaction, and the termination of its evolution indicates that the reaction is complete.

The flask is then fitted for distilling out the excess ethyl mercaptan. This recovered mercaptan can be used for the next batch. During this distillation, the temperature is brought up to 150° C.

The material remaining in the flash is freed of $ZnCl_2$ by washing with dilute hydrochloric acid. The washed material is then dried. Weight of recovered product was found to be 187 g. (99% yield). Index of refraction at 30° C.=1.4750. The density at 30° C. was found to be 0.9546.

*Example 2—Production of ethyl di-n-butylthiolcarbamate.*—To a flask fitted as in Example 1 above are added 191.5 g. (1 mole) of di-n-butylcarbamyl chloride, 124 g. (2 moles) of ethyl mercaptan, and about 5 g. of anhydrous $ZnCl_2$. The temperature gradually increases as the reaction proceeds, being essentially complete in about two hours. At this time, the temperature is about 95° C. The last traces of reaction are completed during an additional one-half hour reaction period. As explained in Example 1, the termination of HCl evolution signifies a completed reaction. The temperature reached at the end of the reaction was 160 C. The excess ethyl mercaptan is distilled out during the final period of the reaction. The material remaining in the flask is washed with dilute hydrochloric acid and then dried. Weight of recovered product was found to be 214.5 g. (98.8% yield). The index of refraction was 1.4728 at 30° C. The density at 30° C. was found to be 0.9355.

*Example 3 — Production of sec-butyl-dimethylthiolcarbamate.*—To a flask fitted as in Examples 1 and 2 above are added 107.5 g. (1 mole) of dimethylcarbamyl chloride 180 g. (2 mole) of sec-butyl mercaptan and about 5 g. of anhydrous $ZnCl_2$. The temperature is held between 40° and 95° C. for two hours during which time the reaction is completed.

The crude product is freed of ethyl mercaptan and $ZnCl_2$ by distilling and washing, as in Example 1 above. The weight of product recovered was 157 g. (97.5% yield). The index of refraction was 1.4820 at 30°C. The density at 30° C. was found to be 0.9860.

*Example 4—Production of phenyl di-n-propylthiolcarbamate.*—To a flask fitted as in examples above are added 163.5 g. (1 mole) of di-n-propylcarbamyl chloride, 121 g. (1.1 mole) of thiophenol, about 5 g. of anhydrous zinc chloride, and about 250 ml. of isooctane. The isooctane is added as an inert diluent. The temperature is held between 45° and 110° C. for two hours, during which time the reaction is completed.

The crude product is freed of isooctane by distilling. The zinc chloride is then removed by washing with aqueous HCl. Washing with dilute NaOH removes the excess thiophenol. The weight of recovered product was 225 g. (95% yield). Its index of refraction at 30° C. was found to be 1.5438.

*Example 5—Production of ethyl-diphenylthiolcarbamate.*—To a flask fitted with a reflux condenser, thermometer and heating mantle are added 46.3 g. (0.2 mole) of diphenyl carbamyl chloride, 24.8 g. (0.4 mole) of ethyl mercaptan, about 1.0 g. of anhydrous zinc chloride, and 250 ml. of chlorobenzene solvent. The temperature is held between 80° and 110° C. for two hours, during which time the reaction is completed. The zinc chloride is removed by washing with dilute hydrochloric acid. The crude product is freed of excess ethyl mercaptan and solvent by distillation. The weight of recovered product, after crystallization, was 41.6 g. (81% yield). The melting range of the product was 98° to 104° C.

*Example 6—Production of n-propyl N-ethyl-n-butyl-thiolcarbamate.*—To a flask fitted with a reflux condenser, thermometer, and heating mantle are added 163.5 g. (1 mole) of N-ethyl-n-butylcarbamyl chloride, 91.4 g. (1.2 mole) of n-propylmercaptan and about 5 g. of anhydrous zinc chloride. The temperature is held between 70° and 160° C. for two hours. The excess mercaptan is distilled out during the final period of reaction. The zinc chloride is removed by washing with dilute hydrochloric acid. The weight of recovered product was 183 g. (90% yield). The index of refraction was 1.4752 at 30° C.

*Example 7 — Production of ethyldiallylthiolcarbamate.*—To a flask fitted with a reflux condenser, thermometer, and heating mantle are added 32 g. (0.2 mole) of diallylcarbamyl chloride, 26 g. (0.35 mole) of ethyl mercaptan and about 1 g. of anhydrous zinc chloride. The temperature is held between 40° C. and 80° C. for three hours, during which time the reaction is completed.

The crude product is freed of excess ethyl mercaptan by distillation. The zinc chloride is removed by washing with dilute hydrochloric acid. Upon washing, the organic phase separates into two portions. The heavy portion is discarded with the hydrochloric acid. The yield of recovered product was 65%. The refractive index at 30° C. was 1.5027. Infrared spectroscopy showed the product to be of higher purity than that prepared by conventional techniques. The conventionally prepared infrared reference material had been purified by distillation to a 1.5° C. boiling range.

*Example 8—Continuous production of ethyl-di-n-propylthiolcarbamate.*—To a heated, one hundred gallon reactor fitted with a reflux condenser, the following reactants are added continuously:

One hundred sixty-five pounds per hour (1.01 moles) of di-n-propyl carbamyl chloride, 71 pounds per hour (1.15 moles) of ethyl mercaptan, and three pounds per hour of anhydrous zinc chloride. Hydrogen chloride is evolved continuously from the top of the reflux condenser while condensed ethyl mercaptan is returned to the reactor. The reactor is held at 100° C. The crude product from this reactor, containing some unreacted di-n-propyl carbamyl chloride and ethyl mercaptan, is discharged continuously to a second one hundred gallon reactor held at 150° C. where most of the remaining di-n-propyl carbamyl chloride reacts with ethyl mercaptan and excess ethyl mercaptan is distilled from the reactor and recovered. The product exiting the second reactor is washed first with aqueous hydrochloric acid and then with water. The product is dried and sent to storage. The yield of product, is 180 pounds per hour (95% based on di-n-propyl carbamyl chloride).

We claim:

1. The process of reacting a carbamyl chloride of the formula:

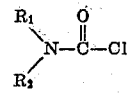

with a mercaptan of the formula:

$$R_3SH$$

wherein $R_1$ and $R_2$ are selected from lower alkyl, lower alkenyl and phenyl radicals and $R_3$ is selected from lower alkyl and phenyl radicals, comprising reacting the compounds at a temperature of from about 20° C. to 160° C. in the presence of zinc chloride as a catalyst for said reaction and recovering therefrom a thiolcarbamic ester.

2. The process of claim 1 wherein the zinc chloride is employed in a quantity of from about 0.5 to 20 grams per gram mole of the carbamyl chloride.

References Cited in the file of this patent

UNITED STATES PATENTS

| | | |
|---|---|---|
| 2,212,895 | Allen | Aug. 27, 1940 |
| 2,642,450 | Weijlard et al. | June 16, 1953 |